United States Patent

Tanaka et al.

[11] Patent Number: 5,806,887
[45] Date of Patent: Sep. 15, 1998

[54] GAS GENERATOR WITH GAS GENERANT CUSHIONING MEMBER AND METHOD OF MAKING THEREOF

[75] Inventors: Koji Tanaka; Kenjiro Nishida, both of Himeji; Hisafumi Kobayashi; Hiroyuki Ochi, both of Asa-gun, all of Japan

[73] Assignees: Sensor Technology Co., Ltd., Kobe; Nippon Kayaku Kabushiki-Kaisha, Tokyo, both of Japan

[21] Appl. No.: 737,312

[22] PCT Filed: May 11, 1995

[86] PCT No.: PCT/JP95/00900

§ 371 Date: Jan. 7, 1997

§ 102(e) Date: Jan. 7, 1997

[87] PCT Pub. No.: WO95/31356

PCT Pub. Date: Nov. 23, 1995

[30] Foreign Application Priority Data

May 12, 1994 [JP] Japan ................................. 6/124368

[51] Int. Cl.⁶ .................................................... B60R 21/26
[52] U.S. Cl. ........................................... 280/741; 102/531
[58] Field of Search ................................. 280/736, 741, 280/742, 740; 102/530, 531

[56] References Cited

U.S. PATENT DOCUMENTS

| | | | |
|---|---|---|---|
| 2,995,088 | 8/1961 | Asplund | 102/530 |
| 4,249,673 | 2/1981 | Katoh et al. | 280/741 |
| 4,530,516 | 7/1985 | Adams et al. | 280/741 |
| 4,561,675 | 12/1985 | Adams et al. | 280/736 |
| 4,590,041 | 5/1986 | Hill | 280/741 |
| 4,943,086 | 7/1990 | Cunningham | 280/741 |
| 5,189,255 | 2/1993 | Fukabori et al. | 280/741 |
| 5,253,895 | 10/1993 | Bretfeld et al. | 280/736 |
| 5,273,722 | 12/1993 | Hogenauer et al. | 280/736 |

FOREIGN PATENT DOCUMENTS

| | | | |
|---|---|---|---|
| 589042 | 3/1994 | European Pat. Off. | 280/736 |
| 3-92447 A | 4/1991 | Japan . | |
| 6-107108 A | 4/1994 | Japan . | |
| 6-39631 U | 5/1994 | Japan . | |

*Primary Examiner*—Peter C. English
*Attorney, Agent, or Firm*—Oblon, Spivak, McClelland, Maier & Neustadt, P.C.

[57] ABSTRACT

A gas generator for an air bag, including a combustion chamber and a hermetic container accommodated in the combustion chamber. Gas generant pellets are charged in the hermetic container. The hermetic container has a wall adapted to be destroyed during combustion of the gas generant pellets. A partition foil piece covers a surface formed by the gas generant pellets charged in the hermetic container so as to conform to a profile of the surface formed by the gas generant pellets. The partition foil piece is non-reactive with the gas generant pellets and has a strength lower than that of the hermetic container. A cushioning member presses the partition foil piece toward the gas generant pellets by a resilient force of the cushioning member so as to suppress movement of the gas generant pellets charged in the hermetic container.

24 Claims, 4 Drawing Sheets

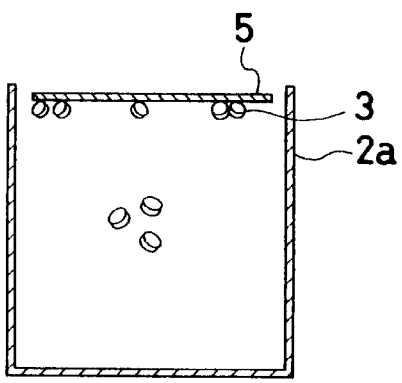
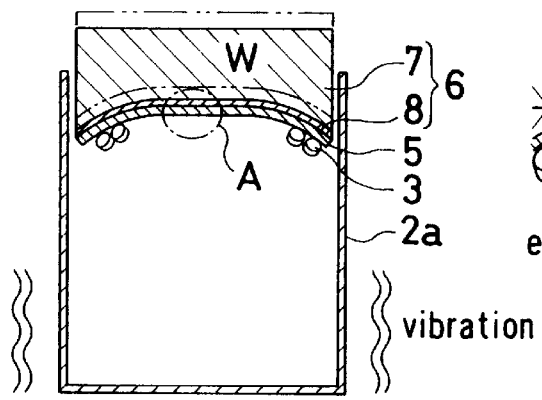
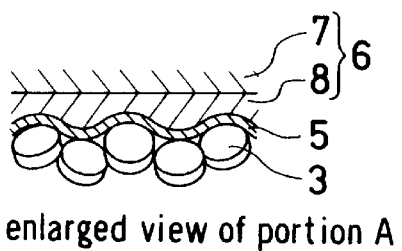
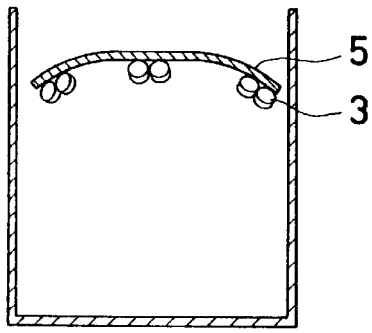
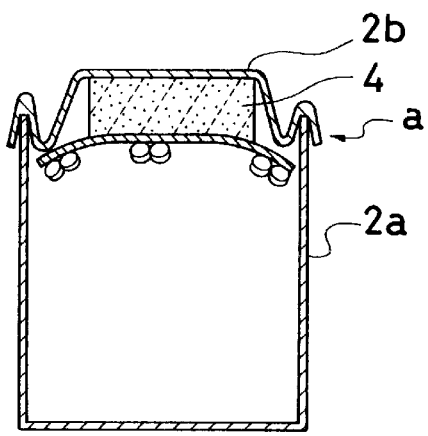

GAS GENERATOR WITH GAS GENERANT CUSHIONING MEMBER AND METHOD OF MAKING THEREOF

BACKGROUND OF THE INVENTION

1. Field of the Invention:

The present invention relates to a gas generator for an air bag and also to a method of fabricating the gas generator. Furthermore, the invention relates to a method of fabricating a hermetic container for receiving gas generant accommodated in a combustion chamber located inside a gas generator for an air bag.

More particularly, the invention relates to a gas generator for an air bag, a method of fabricating the same and a method of fabricating a hermetic container for receiving a gas generant, which prevent pelletized gas generant from being powdered due to vibration.

2. Description of the Related Art:

It is known in the art of a gas generator for inflating an air bag in order to protect passengers in a vehicle that gas generant is sealed in a hermetic container so as to prevent the gas generant from a deteriorating with a lapse of time due to absorbing moisture.

When the gas generant is shaped into pellets, the pelletized gas generants collide with each other or with the hermetic container due to vibration during the vehicle moving, so that the gas generant becomes powder. When the gas generant is powdered by the vibration or for other causes, the whole surface of the gas generant increases in area and a combustion speed of the gas generant becomes rapid. Accordingly, the pressure inside of the gas generator increases. A housing of the gas generator may be destroyed in the worst case. Accordingly, it is necessary to prevent the pelletized gas generant from becoming powder due to the vibration for the purpose of preventing the gas generant from deteriorating as time lapses.

There is a method for preventing the pelletized gas generant from becoming powder, where a cushion member having elasticity is inserted into the hermetic container and vibration of the gas generant is suppressed by the elastic force. Whereby, the pelletized gas generant is prevented from becoming powder. Foamed silicone material and ceramic fiber are known as the above-described cushion member.

However, when the foamed silicone material is utilized, carbon and hydrogen contained in it act with each other during the gas generant burning. The carbon is oxidized by the action and then carbon monoxide is produced. The carbon monoxide is possible to contaminate a gas generated by burning gas generant. The hydrogen is oxidized by the action and then $H_2O$ is produced. The $H_2O$ is possible to have dissolvable ingredient of the combustion residues flow out. The contamination of the generated gas and flowing out the dissolvable ingredient of combustion residues are not suitable for the air bag. Hence, use of this material is inappropriate.

On the other hand, the ceramic fibers do not have such faults. However, these ceramic fibers constitute unwoven fabric, and each diameter of the unwoven fabric is small. Therefore, these ceramic fibers tend to be defaced due to friction between the gas generant and the ceramic fibers caused by vibration. Further, these ceramic fibers tend to break and be powdered due to collision with the gas generant. Consequently, sufficient cushioning property can not be expected. For this reason, the deterioration of the gas generant cannot be effectively prevented as time lapses.

Furthermore, it is necessary to place the cushioning member at one side in the container so that the gas generant may be pressed against the opposite side in the container. Accordingly, it is necessary to cover the gas generant at this one side in the container. Therefore, the amount of the cushioning member cannot be substantially reduced.

SUMMARY OF THE INVENTION

In view of the foregoing problems, the present invention has been made. It is an object of the present invention to provide a gas generator wherein an amount of gas generant loaded in the gas generator can be increased, and wherein a property of preventing the pelletized gas generant from powdering due to vibration is kept, and wherein generated gas is not contaminated. It is another object of the present invention to provide a method of fabricating the gas generator. It is a further object of the invention to provide a method of fabricating a container for receiving gas generant used in the gas generator.

The problems are solved according to the present invention by providing a new gas generator for an air bag, including a combustion chamber, a hermetic container accommodated in the combustion chamber, gas generant pellets charged in the hermetic container, a partition foil piece, and a cushioning member. The hermetic container has a wall adapted to be destroyed during combustion of the gas generant pellets. The partition foil piece is adapted to cover a surface formed by the gas generant pellets charged in the hermetic container so as to conform to a profile of the surface formed by the gas generant pellets. The partition foil piece is non-reactive with the gas generant pellets and has a strength lower than that of said hermetic container. The cushioning member presses the partition foil piece toward the gas generant pellets by a resilient force of the cushioning member so as to suppress movement of the gas generant pellets charged in the hermetic container.

The hermetic container comprises a container body member for receiving the gas generant pellets and a lid member fastened to the container body member.

The cushioning member is placed in the lid member. The hermetic container is made of aluminum foil having a thickness of from 0.15 to 0.25 mm.

In another aspect of the novel gas generator described above, sealing foils adapted to be destroyed by a pressure of burning gas are located either at exit holes for burning gas discharged from the combustion chamber or at exit openings for burning gas discharged from the gas generator.

Whether the gas generant pellets are placed in the combustion chamber directly or indirectly by means of the hermetic container, the partition foil piece is preferably made of aluminum foil having a thickness of from 0.075 to 0.15 mm.

When the partition foil piece is made of a material including an iron alloy, a stainless steel foil, which has a thickness of from 0.02 to 0.04 mm in order to obtain a strength lower than that of the hermetic container, is suitable as the partition foil piece.

In addition, the cushioning member is preferably made of unwoven fabric consisting of ceramic fibers.

A method of fabricating a container for receiving gas generant pellets according to the present invention is one of methods concerning fabricating the hermetic container accommodated in the novel gas generator.

In the method, gas generant pellets are charged into a container body member of the gas generant container including thin walls adapted to be destroyed during combustion of the gas generant pellets. A partition foil piece is placed on a surface formed by the gas generant pellets charged in the container body member. The partition foil piece is non-reactive with the gas generant pellets and has a strength lower than that of the container body member. The gas generant pellets charged in the container body member are pressed and vibrated so as to be densely charged in said container body member. The gas generant pellets are pressed via the partition foil piece such that the partition foil piece is deformed so as to substantially conform to a profile of the surface formed by the gas generant pellets charged in the container body member. A lid member having a cushioning member therein is fastened to the container body member so as to press the partition foil piece toward the gas generant pellets.

In another method of fabricating a gas generator of an air bag, gas generant pellets are charged into a combustion chamber located inside a body of the gas generator including sealing foils adapted to be destroyed by a pressure of burning gas during combustion of the gas generant pellets. The sealing foils are placed either at exit holes for burning gas discharged from the combustion chamber or at exit openings for burning gas discharged from the body of the gas generator. A partition foil piece is placed on a surface formed by the gas generant pellets charged in the combustion chamber. The partition foil piece is non-reactive with the gas generant pellets and is deformable so as to substantially conform to a profile of the surface formed by the gas generant pellets charged in the combustion chamber. The gas generant pellets charged in the combustion chamber are pressed and vibrated so as to be densely charged in the combustion chamber. The gas generant pellets are pressed via the partition foil piece such that the partition foil piece is deformed so as to substantially conform to the profile of the surface formed by the gas generant pellets. A cushioning member is set on the partition foil piece. The body of the gas generator is closed with a cover.

If the size of the space for accommodating the cushioning member cannot be established accurately in the closing step, the cushioning member may be fixed in the combustion chamber with a holding member in the setting step. The closing step is carried out easily by pressing the cover against the body of the gas generator with friction between them.

The pressing steps in both methods of fabricating the container and the gas generator may be carried out with a press member having a press surface which faces to the partition foil piece and which has a concave curved shape and a deformable pressure-transmitting member.

The operation of the above-described configuration is now described.

In the above-described configuration, the presence of the partition foil piece between the charged pellets of the gas generant and the cushioning member prevents the pellets from colliding with or rubbing against the cushioning member due to vibration. Therefore, the cushioning member can maintain its characteristics of suppressing the movement of the pellets even though time lapses. Hence, the gas generant pellets are prevented from powdering due to vibration.

And, the partition foil piece is non-reactive with the gas generant. Therefore, the partition foil piece does not react with the gas generant during combustion of the gas generant and does not contaminate generated gas.

Moreover, when the cushioning member is made of unwoven fabric consisting of ceramic fibers, the cushioning member also does not react with the gas generant during combustion of the gas generant. Hence, the generated gas also is not contaminated by the cushioning member. And safety for a passenger is assured.

Additionally, since the gas generant pellets charged in the container or the combustion chamber are not directly pressed by the cushioning member, the charged gas generant pellets contact with the partition foil piece directly. Consequently, it is not necessary for the cushioning member to press a whole surface formed by the charged gas generant pellets if the partition foil piece has an appropriate strength. Therefore, an amount of the cushioning member can be reduced, and an amount of the charged gas generant pellets can be increased.

The appropriate strength is sufficient to maintain the shape of the foil after it is deformed substantially according to the profile of the surface formed by the charged pellets.

When the partition foil piece is made of aluminum, the appropriate strength is obtained by setting the thickness of the foil from 0.075 to 0.15 mm. When the partition foil piece is made of stainless steel including an iron alloy-material, the appropriate strength is obtained by setting the thickness of the foil from 0.02 to 0.04 mm.

When the hermetic container is composed of the container body member and the lid member, the gas exit holes can be formed at a lower or side portion of the combustion chamber if the cushioning member is placed in the lid member.

In the fabrication method according to the present invention, the partition foil piece provided with the appropriate strength keeps the deformation conforming to the profile of the surface formed by the charged gas generant pellets even if the pressing force used in the pressing step is removed. Therefore, the surface formed by the charged gas generant pellets does not lift up. And a finished product has a densely charged state of the gas generant. In consequence, the container and the gas generator according to the present invention can be charged with more amount of the gas generant pellets than heretofore.

When the press member has a material which is deformable and transmittable with respect to pressure and has a concave curved surface facing to the partition foil piece, the surface formed with the charged pellets of the gas generant is made convex. Therefore, the container body member can be hermetically closed with the lid member of the container without difficulty caused by an existence of the gas generant. And also the body of the gas generator can be closed with the cover without difficulty caused by an existence of the gas generant.

BRIEF DESCRIPTION OF THE DRAWINGS

FIGS. 2(a)–2(e) are views illustrating the sequence of steps of a method for fabricating a gas generant container for use with the novel gas generator;

DETAILED DESCRIPTION OF THE PREFERRED EMBODIMENTS

Embodiments of the present invention are hereinafter described with reference with the accompanying drawings.

Figure 1:
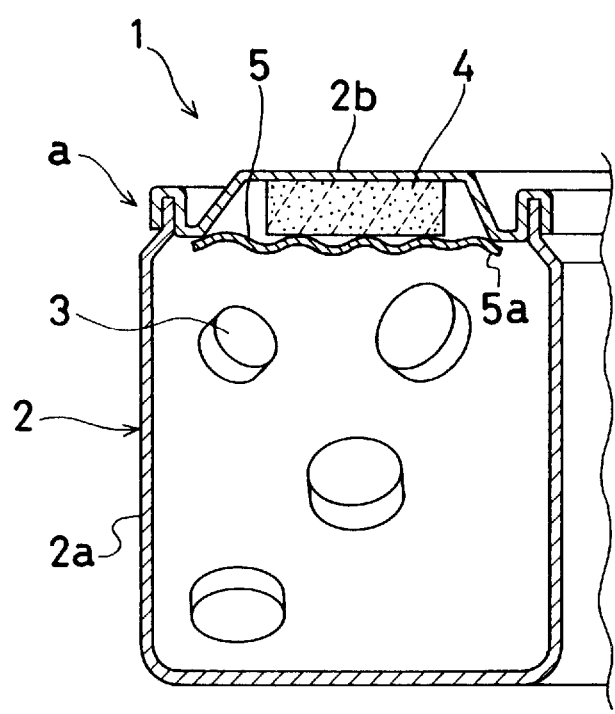
FIG. 1 is a cross-sectional view of a gas generant container that is a hermetic container used in a gas generator according to the present invention.

A gas generator according to the present invention is first described by referring to FIG. 1.

Referring to FIG. 1, there is shown a gas generant container 1 that is a hermetic container constituting a gas generator according to the invention. This gas generant container 1 is accommodated in a combustion chamber of the gas generator for an automobile air bag.

In FIG. 1, the gas generant container 1 comprises a container body member 2a and a lid member 2b fitting over the container body member 2a.

The gas generant container 1 is an annular hermetic container 2 in which an end portion (a) of the lid member 2b is crimped so as to clamp edges of the container body member 2a. The container body member 2a of the hermetic container 2 is charged with gas generant pellets 3. An annular cushioning member 4 is placed in a recessed portion of the lid member 2b. An annular partition foil piece 5 is disposed between the cushioning member 4 and the gas generant 3 in contact with both of them. The partition foil piece 5 is placed so as to cover the recessed portion of the lid member 2b. The partition foil piece 5 has edge portions 5a, conforming to the profiles of the edges of the recessed portion of the lid member 2b.

The hermetic container 2 can be used in a gas generator having gas exit holes at a lower or side portion of a gas generating chamber provided the lid member 2b having the cushioning member 4 in it.

It is also possible to place the cushioning member 4 at the bottom of the container body member 2a of the hermetic container 2. In this case, the container can be used in a gas generator having gas exit holes at an upper or a side portion of a gas generating chamber.

For example, the hermetic container 2 is made of a thin sheet of aluminum whose thickness has a range of about from 0.15 to 0.25 mm. This thickness brings about a destruction of the container when the gas generant 3 burns. The cushioning member 4 can be made of unwoven fabric consisting of ceramic fibers, whose thickness is 2 mm, so as to prevent the generated gas from becoming contaminated.

Preferably, the partition foil piece 5 is made of a material which does not act with the gas generant 3 so as to prevent the generated gas from being contaminated. In order to suppress the movement of the surface formed by the charged pellets of the gas generant during fabrication as described later and to prevent the charged pellets from becoming powder, it is necessary for the partition foil piece to deform appropriately according to the profile of the surface formed by the charged pellets of the gas generant and to keep the deformed shape. For these reasons, the partition foil piece preferably has appropriate deformability and strength.

The hermetic container 2 is likely to be damaged to rub against the partition foil piece 5 when the partition foil piece 5 is in directly contact with the hermetic container 2 and the strength of the partition foil piece 5 is greater than that of the hermetic container 2. Consequently, the hermetic container 2 is possibly opened.

Therefore, the material of the partition foil piece 5 preferably has a strength lower than that of the hermetic container 2. Aluminum satisfies these conditions. In the present example, both components are made of aluminum. Preferably, the thickness of the partition foil piece 5 is set from 0.075 to 0.15 mm. When the thickness is less than 0.075 mm, the strength is insufficient. A vibration experiment in which accelerations of ±5 G are applied was conducted. As the result of it, the partition foil piece 5 was broken when the thickness was 0.05 mm.

When the thickness of the partition foil piece 5 is greater than 0.15 mm, the strength of the hermetic container 2 may be lower than that of the partition foil piece 5 since the minimum thickness of the hermetic container 2 is 0.15 mm. The hermetic container 2 is likely to have holes on it. Therefore, in the present embodiment, the thickness of the partition foil piece 5 is set at 0.1 mm.

When the gas generant 3 is made of azide-based agents, the gas generant 3 has a property of absorbing moisture. For this reason, the gas generant is hermetically sealed in the hermetic container 2.

The hermetic container 2 of the present invention also can be applied to other types of gas generants which do not have the property of absorbing moisture. Because, the hermetic container 2 is used in order to prevent gas generant powder from flowing out a gas generator.

The operation and the effects are next described. In FIG. 1, the resilient force of the cushioning member 4 acts on the gas generant 3 through the partition foil piece 5. Even if external vibrations are applied, movement of the gas generant 3 is suppressed. Thus the gas generant pellets are prevented from being powdered.

In this case, the aluminum partition foil piece 5 is interposed between the gas generant 3 and the cushioning member 4, the cushioning member 4 can not be in direct contact with the gas generant. The gas generant pellets 3 do not collide with or rub against the cushioning member 4 due to vibration.

Therefore, even if the cushioning member 4 is made of ceramic fibers which tend to wear out, it is possible that the gas generant pellets have been prevented from becoming powder for lapse of long time. Furthermore, the partition foil piece 5 of aluminum does not act with the gas generant.

In addition, it is not necessary for the cushioning member 4 to support the whole surface formed by the charged pellets 3 of the gas generant since the partition foil piece 5 has the appropriate strength. With respect to the cushioning member 4, it is only necessary to take account of the resilient force. So, it is possible to reduce an amount of the cushioning member 4. The amount of cushioning member was 3.3 g in the prior art while, for example, the amount of cushioning member may be 1.5 g in the present invention. In this way, even if the amount of cushioning member is reduced to half, in the present invention, the movement of the gas generant due to vibration is more suppressed than prior art.

For this reason, even if the inside volume of the hermetic container 2 was the same as that of the prior art container, the container can be charged with more amount of gas generant comparing to the conventional container.

A method of fabricating the gas generant container 1 for the novel gas generator in accordance with the present invention is described by referring to FIGS. 2(a)–2(d).

In FIG. 2(a), the gas generant 3 in the form of pellets are charged into a container body member 2a of the hermetic container and then the partition foil piece 5 is placed on a surface formed by the charged pellets 3 of the gas generant.

In FIG. 2(b), a press member 6 is placed on the partition foil piece 5 to press it. The press member 6 comprises a disk like body 7 having a concave curved surface facing to the partition foil piece 5 and a deformable pressure-transmitting member 8 which is mounted on the concave curved surface and made of rubber or the like. The pressure-transmitting member 8 transmits the pressure from the press member 6 to the partition foil piece 5 by its deformation.

When vibration is applied, the gas generant pellets 3 are charged densely by the vibration and by the action of the load of the press member 6.

Accordingly, the position of the surface formed by the charged pellets moves from a position indicated by a phantom line to a position indicated by a solid line. At this time, the whole shape of the surface formed by the charged pellets 3 is made convex to conform to the profile of the concave curved surface of the press member 6. As shown in the enlarged view of portion A (see FIG. 2(e)), the deformable pressure-transmitting member 8 of the press member 6 presses the partition foil piece 5 against the gas generant 3 by deforming subtly in accordance with the uneven surface formed by charged pellets of the gas generant 3. Therefore, the partition foil piece 5 deforms according to the profile of the surface formed by the charged pellets 3. The deformable pressure-transmitting member 8 can be made of a pile of many thin aluminum foils, sponge, and other materials, as well as rubber.

In FIG. 2(c), the press member 6 is removed. If the press member 6 was removed in the prior art wherein the partition foil piece 5 does not exist, the surface formed by the charged pellets of the gas generant 3 lifts up during transportation for the next manufacturing step. Consequently, the densely charged state of the gas generant could not be maintained. On the contrary, even if the press member was removed in the present invention, the partition foil piece 5 has still deformed according to the profile of the surface formed by the charged pellets of the gas generant 3 since it was deformed by the press member. Hence, the gas generant 3 does not move and the densely charged state of the gas generant can be maintained.

In FIG. 2(d), the cushioning member 4 is placed on the partition foil piece 5. The lid member 2b is put together with the top end of the container body member 2a. The end portion (a) of the lid member 2b is crimped and sealed to clamp edges of the container body member 2a, and thus fabricating the hermetic container for gas generant is completed.

The gas generant 3 does not interfere with crimping the end portion (a) of the lid member 2b since the surface formed by the charged pellets of the gas generant 3 is convex.

A finished product can be obtained with maintaining the densely charged state of the as generant 3 according to the present invention. As a consequence, the amoun t of the charged gas generant 3 can be incorporated.

Figure 3:
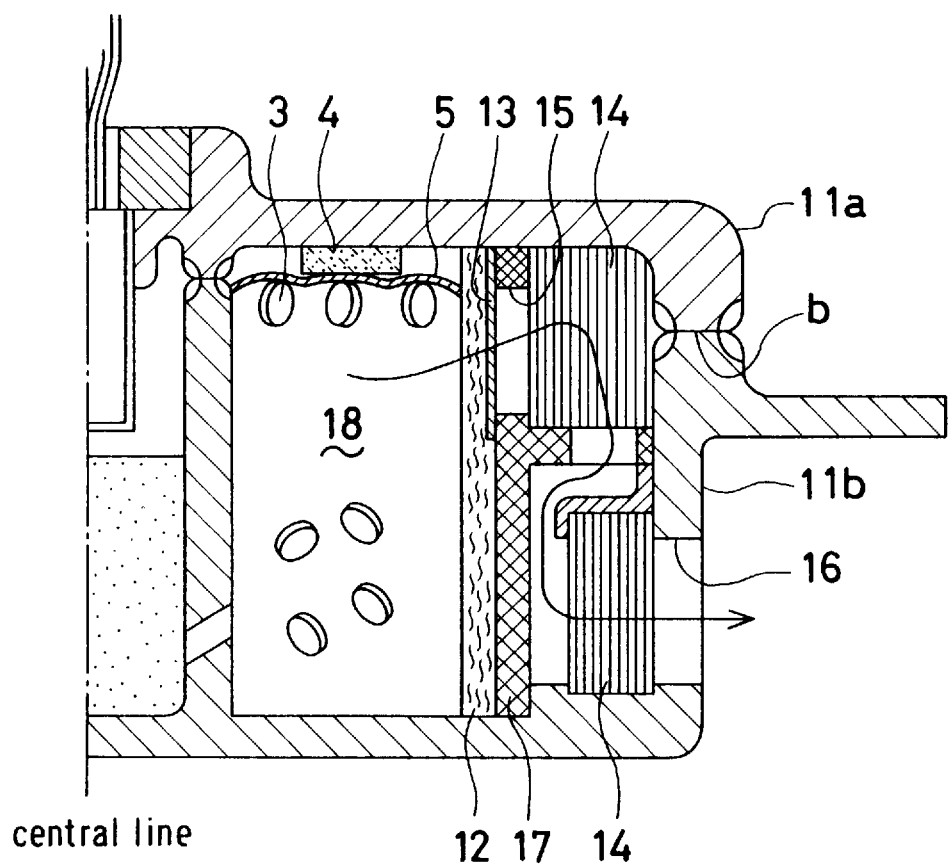
FIG. 3 is a cross-sectional view of a gas generator according to the present invention.

Another gas generator according to the present invention is described by referring to FIG. 3, wherein the gas generator has a combustion chamber in which gas generant pellets 3 are directly placed.

In this gas generator, the combustion chamber 18 is constructed of a body 11b, a cover 11a and a partition wall 17 having gas exit holes 15. Gas generated in the combustion chamber 18 passes through the gas exit holes 15 and a filter 14 following the route illustrated by arrow in FIG. 3, and flows out from the gas exit openings 16.

Sealing foils 13 are stuck to the gas exit holes 15 to maintain an airtightness of the combustion chamber 18. A strength of the sealing foil 13 is that of the same foil as is destroyed by the pressure of the burning gas. For example, an aluminum sheet having a thickness range about from 0.15 to 0.25 mm can be used. The sealing foils 13 may be stuck at any desired as long as the airtightness can be maintained. For example, the foils may be installed at the gas exit openings 16 of the gas generator. A numeral 12 shows a filter playing a role of a coolant also.

The gas generant pellets 3 are directly charged into the aforementioned combustion chamber 18. A cushioning member 4 is placed on the surface formed by the charged pellets of the gas generant 3 in order to suppress the movement of the pellets 3 due to vibrations by a resilient force of the cushioning member 4. The cushioning member 4 is made of unwoven fabric consisting of ceramic fibers.

A partition foil piece 5 which is non-reactive with the gas generant pellets 3 is disposed between the cushioning member 4 and the surface formed by the charged pellets of the gas generant 3. The shape of the partition foil piece 5 conforms to the profile of the surface formed by the charged pellets. When the partition foil piece 5 is made of an aluminum foil, the thickness of the foil is preferably set from 0.075 to 0.15 mm. When the partition foil piece 5 is made of stainless steel based on an iron alloy, the thickness of the foil is preferably set from 0.02 to 0.04 mm.

One method of fabricating the novel gas generator having the combustion chamber 18 in which the gas generant pellets 3 are directly charged in accordance with the present invention is next described.

The body of the gas generator is prepared, which has the sealing foils which are stuck to either the gas exit holes 15 as shown in FIG. 3 or the gas exit openings 16 so as to maintain the airtightness.

The gas generant pellets 3 are directly charged into the combustion chamber 18 in the body 11b of the gas generator. Then, the aforementioned deformable partition foil piece 5 is placed on the surface formed by the charged pellets of the gas generant 3. Thereafter, the pellets 3 are pressed through the partition foil piece 5. At the same time, vibration is given to the pellets. As a result, the pellets 3 are charged densely. The partition foil piece 5 is deformed according to the profile of the surface formed by the charged pellets. Then, the cushioning member 4 is placed on the top surface of the partition foil piece 5. Subsequently, the cover 11a closes the body 11b of the gas generator.

The pressing step is carried out by placing a press member on the partition foil piece 5. The press member is similar to the press member 6 shown in FIG. 2.

The closing step is carried out by a friction welding. The inner surface of the cover 11a may be rubbed against the cushioning member 4.

After this friction welding, the cushioning member 4 is pushed into the combustion chamber 18 by about several millimeters. Alphabet (b) in FIG. 3 shows the closed surface.

Figure 4:
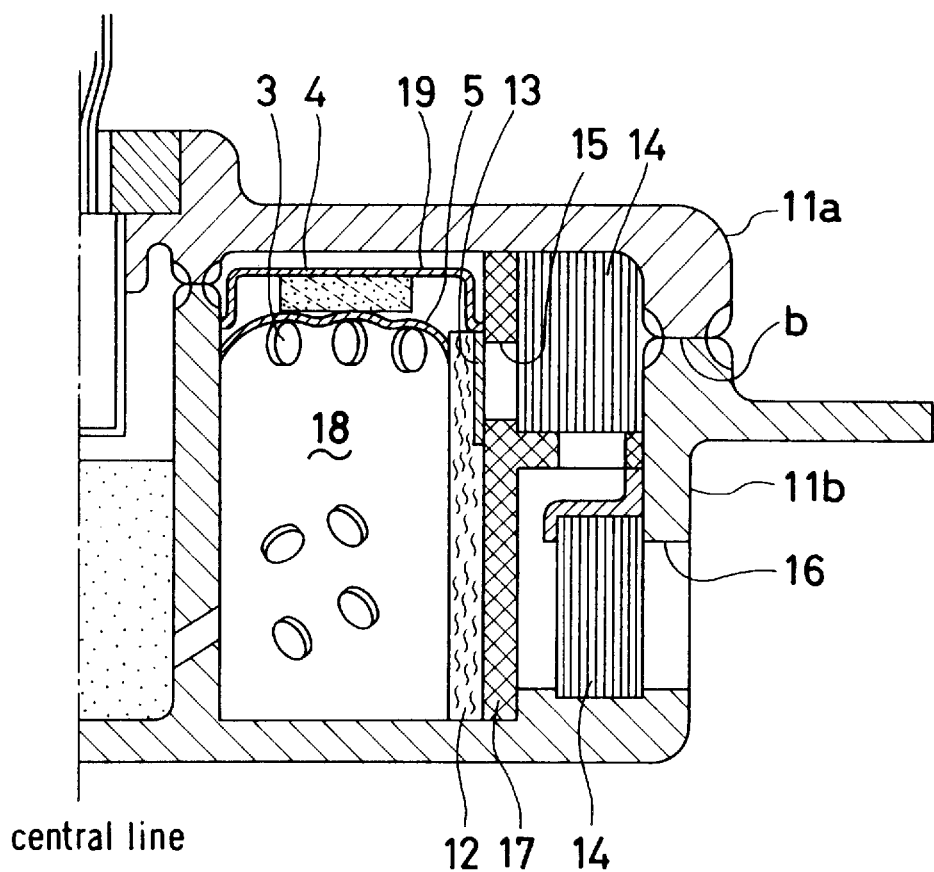
FIG. 4 is a cross-sectional view of another gas generator according to the invention.

Another gas generator according to the present invention is next described by referring to FIG. 4, wherein a combustion chamber 18 of a gas generator is directly loaded with gas generant pellets 3. In this gas generator, a holding member 19 for a cushioning member 4 is mounted between a cover 11a and a partition foil piece 5.

When a size of a space for accommodating the cushioning member 4 can not be established accurately because the gas generator is fabricated by the friction welding, a gap may be created between the cushioning member 4 and the cover 11a. In this case, it happens that the resilient force of the cushioning member 4 is not transmitted to the partition foil piece 5.

Therefore, according to the present invention, the cushioning member 4 has been previously fixed inside the combustion chamber 18 by the holding member 19 in a step of placing the cushioning member. The cushioning member 4 can press the partition foil piece 5 with an appropriate pressing force. In FIG. 4, the holding member 19 is mounted in the combustion chamber 18 by means of pressure inserting. The cover 11a closes the body 11b after the cushioning member 4 is fixed by the holding member 19.

In the description provided thus far, pellets are prevented from being powdered by vibration, which are accommodated in a certain space having airtightness. However, it is not always required that the space have airtightness.

Any kind of chemical gas generant can be used in this embodiment as long as the gas generant is pelletized. The most preferable gas generants are those made from azide-based materials.

The present invention is adapted for a gas generator, a method of fabricating the gas generator, and a method of fabricating a gas generant container for the gas generator, which enable the amount of charged gas generant to increase, which can prevent gas generant pellets from being powdered by vibration for lapse of long time and which does not contaminate generated gas.

Obviously, numerous modifications and variations of the present invention are possible in light of the above teachings. It is therefore to be understood that within the scope of the appended claims, the invention may be practiced otherwise than as specifically described herein.

What is claimed is:

1. A gas generator for an air bag, comprising:
 a combustion chamber;
 a hermetic container accommodated in said combustion chamber;
 gas generant pellets charged in said hermetic container, said hermetic container having a wall adapted to be destroyed during combustion of said gas generant pellets;
 a partition foil piece adapted to cover a surface formed by said gas generant pellets charged in said hermetic container so as to conform to a profile of the surface formed by said gas generant pellets, said partition foil piece being non-reactive with said gas generant pellets and having a strength lower than that of said hermetic container; and
 a cushioning member adapted to press said partition foil piece toward said gas generant pellets by a resilient force of said cushioning member so as to suppress movement of said gas generant pellets charged in said hermetic container.

2. A gas generator of claim 1, wherein said hermetic container includes a container body member and a lid member mounted on said container body member, said container body member containing said gas generant pellets, said lid member having said cushioning member therein.

3. A gas generator of claim 2, wherein said hermetic container is made of aluminum foil.

4. A gas generator of claim 2, wherein said partition foil piece is made of aluminum.

5. A gas generator of claim 1, wherein said hermetic container is made of aluminum foil.

6. A gas generator of claim 5, wherein said hermetic container has a thickness of from 0.15 to 0.25 mm.

7. A gas generator of claim 1, wherein said partition foil piece is made of aluminum.

8. A gas generator of claim 7, wherein said partition foil piece has a thickness of from 0.075 to 0.15 mm.

9. A gas generator of claim 1, wherein said partition foil piece is made from a material including iron alloy.

10. A gas generator of claim 9, wherein said material is stainless steel.

11. A gas generator of claim 10, wherein said partition foil piece has a thickness of from 0.02 to 0.04 mm.

12. A gas generator of claim 1, wherein said cushioning member consists of unwoven fabric made of ceramic fibers.

13. A method of fabricating a gas generant container for a gas generator of an air bag, comprising the steps of:
 charging gas generant pellets into a container body member of the gas generant container including thin walls adapted to be destroyed during combustion of said gas generant pellets;
 placing a partition foil piece on a surface formed by said gas generant pellets charged in said container body member, said partition foil piece being non-reactive with said gas generant pellets and having a strength lower than that of said container body member;
 pressing and vibrating said gas generant pellets charged in said container body member so as to densely charge said gas generant pellets in said container body member, said gas generant pellets being pressed via said partition foil piece such that said partition foil piece is deformed so as to substantially conform to a profile of the surface formed by said gas generant pellets charged in said container body member; and
 fastening a lid member having a cushioning member therein to said container body member so as to press said partition foil piece toward said gas generant pellets.

14. A method of claim 13, wherein said pressing and vibrating step comprises:
 utilizing a press member having a press surface facing to said partition foil piece, said press surface having a concave curved shape and a deformable pressure transmitting member.

15. A method of fabricating a gas generator of an air bag, comprising the steps of:
 charging gas generant pellets into a combustion chamber located inside a body of said gas generator including sealing foils adapted to be destroyed by a pressure of burning gas during combustion of said gas generant pellets, said sealing foils being placed either at exit holes for the burning gas discharged from said combustion chamber or at exit openings for the burning gas discharged from the body of said gas generator;
 placing a partition foil piece on a surface formed by said gas generant pellets charged in said combustion chamber, said partition foil piece being non-reactive with said gas generant pellets and being deformable so as to substantially conform to a profile of the surface formed by said gas generant pellets charged in said combustion chamber;
 pressing and vibrating said gas generant pellets charged in said combustion chamber so as to densely charge said gas generant pellets in said combustion chamber, said gas generant pellets being pressed via said partition foil piece such that said partition foil piece is deformed so as to substantially conform to the profile of the surface formed by said gas generant pellets;
 setting a cushioning member on said partition foil piece; and
 closing the body of the gas generator with a cover.

16. A method of claim 15, wherein said setting step comprises: fixing said cushioning member inside said combustion chamber by a holding member.

17. A method of claim 15, wherein said closing step comprises:
 carrying out a friction welding.

18. A method of claim 15, wherein said pressing and vibrating step comprises:
 utilizing a press member having a press surface facing to said partition foil piece, said press surface having a concave curved shape and a deformable pressure transmitting member.

19. A gas generator for an air bag, comprising:

a combustion chamber;

gas generant pellets charged in said combustion chamber;

a partition foil piece adapted to cover a surface formed by said gas generant pellets charged in said combustion chamber so as to conform to a profile of the surface formed by said gas generant pellets, said partition foil piece being non-reactive with said gas generant pellets and having a strength sufficient to maintain its shape conforming to the profile of the surface formed by said gas generant pellets after said partition foil piece is deformed so as to conform to the profile of the surface formed by said gas generant pellets; and a cushioning member adapted to press said partition foil piece toward said gas generant pellets by a resilient force of said cushioning member so as to suppress movement of said gas generant pellets charged in said combustion chamber.

20. A gas generator of claim 19, wherein said partition foil piece is made of aluminums.

21. A gas generator of claim 20, wherein said partition foil piece has a thickness of from 0.075 to 0.15 mm.

22. A gas generator of claim 19, wherein said partition foil piece is made from a material including iron alloy.

23. A gas generator of claim 22, wherein said material is stainless steel.

24. A gas generator of claim 23, wherein said partition foil piece has a thickness of from 0.02 to 0.04 mm.

* * * * *